(12) United States Patent
Salmela et al.

(10) Patent No.: US 6,181,938 B1
(45) Date of Patent: Jan. 30, 2001

(54) INTELLIGENT CALL ROUTING IN TELECOMMUNICATION NETWORK WITH DUAL MODE TERMINALS

(75) Inventors: Seija Salmela, Masala; Markku Tuohino, Espoo, both of (FI)

(73) Assignee: Kolster Oy AB, Espoo (FI)

( * ) Notice: Under 35 U.S.C. 154(b), the term of this patent shall be extended for 0 days.

(21) Appl. No.: 09/202,075

(22) PCT Filed: Jun. 3, 1997

(86) PCT No.: PCT/FI97/00343

§ 371 Date: Dec. 7, 1998

§ 102(e) Date: Dec. 7, 1998

(87) PCT Pub. No.: WO97/48243

PCT Pub. Date: Dec. 18, 1997

(30) Foreign Application Priority Data

Jun. 7, 1996 (FI) ......................................... 962379

(51) Int. Cl.$^7$ ........................................... H04Q 7/20
(52) U.S. Cl. ............................................ 455/433; 455/435
(58) Field of Search .................................... 455/432, 433, 455/434, 435, 436, 445, 450, 452, 455, 458

(56) References Cited

U.S. PATENT DOCUMENTS

| 5,127,042 | 6/1992 | Gillig et al. . |
|---|---|---|
| 5,469,496 | 11/1995 | Emery et al. . |
| 5,953,667 | * 9/1999 | Kauppi ................................... 455/435 |
| 6,058,309 | * 5/2000 | Haung et al. ........................ 455/433 |

FOREIGN PATENT DOCUMENTS

| 462 727 | 12/1991 | (EP) . |
|---|---|---|
| 627 864 | 12/1994 | (EP) . |
| 700 227 | 3/1996 | (EP) . |
| 2 282 730 | 4/1995 | (GB) . |
| 93/16549 | 8/1993 | (WO) . |
| 95/23488 | 8/1995 | (WO) . |

\* cited by examiner

*Primary Examiner*—Thanh Cong Le
(74) *Attorney, Agent, or Firm*—Pillsbury Madison & Sutro LLP (57) ABSTRACT

A dual mode (GSM/DECT) terminal requires new qualities of a mobile telephone network. The dual mode (or multimode) DMT terminal has one primary subscriber number, either DDI number, a MSISDN number or a so called personal number especially served for this service. In calling the DMT subscriber, the primary number is used regardless of whether the subscriber is in an exchanged area or in the mobile telephone network. The intelligent network technology takes care of locating updating. The subscriber location is checked in the service control point of the intelligent network. The call terminal at the DMT subscriber is routed to the address given by the intelligent network.

10 Claims, 6 Drawing Sheets

INTELLIGENT CALL ROUTING IN TELECOMMUNICATION NETWORK WITH DUAL MODE TERMINALS

This application is the national phase of international application PCT/FI97/00343 filed Jun. 3, 1997 which designated the U.S.

BACKGROUND OF THE INVENTION

The invention relates to the establishing of calls in a telecommunication network comprising dual or multi mode terminals, for instance DECT/GSM terminals that can be used like cordless terminals in a private network exchange and like a cellular dual mode terminal in a cellular mobile telephone network. Within the scope of the present application terminals of that description are called dual mode terminals (DMT) and the users correspondingly DMT subscribers.

Cordless telephone systems—like DECT (Digital European Cordless Telephone), which is described in recommendation 300 175 of ETSI—support subscriber mobility in a very limited fashion. Within the scope of the present application, such a network is called a network supporting limited subscriber mobility.

Mobile telephone networks, like the European GSM/DCS system, well support subscriber mobility outdoors. Within the scope of the present application, such a network is called a network supporting extensive subscriber mobility. Cordless PABX:s support subscriber mobility in areas that are typically limited to indoor spaces. Furthermore, the PABX provides the subscriber with exchange services.

Dual or multi mode terminals DMT are developed with a view to subscriber mobility both indoors and outdoors. Such a DMT terminal requires new qualities of the mobile telephone network, e.g. for numbering, mobility management and call routing of the DMT subscriber. Known mobile networks cannot handle subscriber mobility in a system comprising both networks that support limited subscriber mobility and networks that support extensive subscriber mobility.

BRIEF SUMMARY OF THE INVENTION

Accordingly, it is the primary object of the present invention to establish a call originating in or terminating at a DMT terminal. It is an intermediate object of the invention to perform the numbering and mobility management of the DMT subscriber in such a way that it will be possible for the subscriber to move between the private network and the mobile telephone network and be reached by one subscriber number. The objects of the invention can be achieved by the methods and systems as characterized in the appended independent claims. The preferred embodiments of the invention are shown in the dependent claims.

The invention is based on the idea that the DMT subscriber is assigned a primary dialling number, e.g. a network exchange number (a so called Direct Dialling In number) or a so called personal number. Within the scope of the present application that number is called the primary number. The primary number is used for calling the DMT subscriber regardless of whether the subscriber is located in the area of a network exchange or in the mobile telephone network. The intelligent network technology supports (supplements) the mobility management of the mobile telephone network by providing routing service (e.g. to a company exchange (PABX)). When the terminal switches from one mode to another, this information is updated in the service control point (SCP) of the intelligent network (IN) that stores information for instance in the service data point (SDP) connected to it. A call terminating at the DMT subscriber terminal is routed to a network given by the intelligent network (a mobile telephone network or a private network) which in its turn routes the call to the subscriber terminal according to the prevailing protocol in the respective network.

The advantage of the method and system of the invention is among other things that the same DMT terminal can be used both in an exchange area and in a mobile telephone network. When the DMT subscriber is in the area of a private network exchange, a private network tariff can be applied. One subscriber number only is needed for contacting a DMT subscriber. The invention requires relatively few changes to be made in the GSM system. The necessary changes can be restricted to a clearly defined area, e.g. to the mobile telephone exchange of the GSM system.

BRIEF DESCRIPTION OF THE DRAWINGS

The invention will be described more in detail by means of preferred embodiments with reference to the appended drawings in which.

DETAILED DESCRIPTION OF THE INVENTION

Figure 1A:
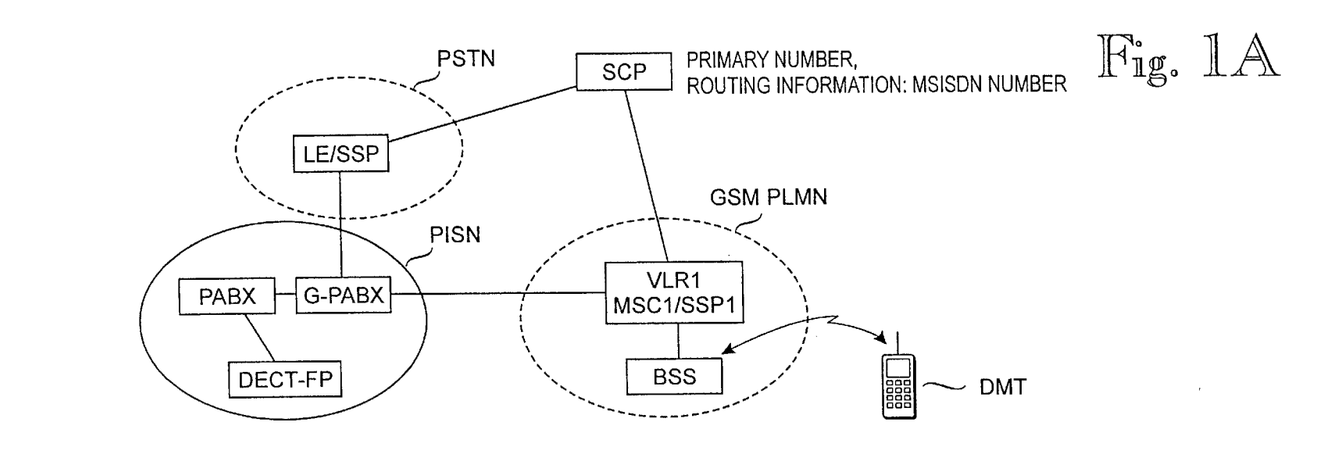
FIG. 1A shows a case where a DMT subscriber is in the area of a mobile telephone network.

FIG. 1A shows a case where a DMT subscriber is in the area of a mobile telephone network. The following references will be used in this application. PSTN=Public Switched Telephone Network=public telephone network. LE Local Exchange=a switching system of a public telephone network, like a local exchange. PISN=Private Integrated Services Network. PABX=Private Automatic Branch exchange=telephone exchange (of a company). SCP=Service Control Point (of an intelligent network). DECT-FP=the Fixed Part of a DECT network. G-PABX=Gateway PABX=gateway exchange. MSC=Mobile Switching Center=a switching system of a mobile telephone network, like a mobile telephone exchange. RI=Routing Information. RA=Routing Address. Additionally, within the scope of this application the mobile telephone exchange MSC comprises a Service Switching Point SSP of the intelligent network.

Figure 1B:
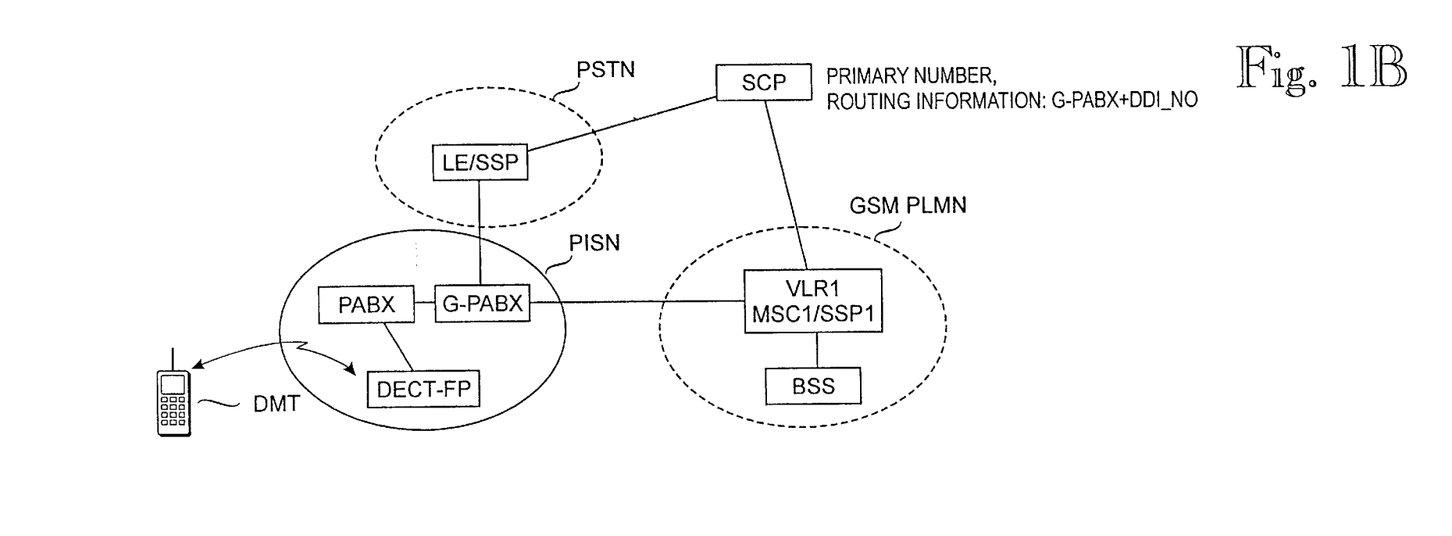
FIG. 1B shows a case where a DMT subscriber is in the area of a private network.

In FIGS. 1A and 1B it is assumed by way of example but without in any way restricting the invention that inside the PISN network there is a gateway exchange G-PABX and subordinate to that an exchange PABX. The architecture of the private network is not relevant from the point of view of the invention. The invention can be applied generally for routing a call between two different networks, where at least one network supports subscriber mobility. The concept "private network" should be interpreted as an example illustrating an embodiment of the invention.

In calling a DMT terminal by using the primary number (e.g. a DDI number), the mobile switching center MSC and/or a service switching point SSP connected to it initiates a service inquiry to the intelligent network and especially to its service control point SCP. As a result of this service request the service control point SCP returns the routing information of the DMT subscriber to the mobile switching center MSC. The routing information guides the mobile switching center either to proceed normally with the mobile-terminating call or it guides the mobile switching center to route the call to the private network (PISN/PABX).

In this case, it is assumed that the DMT subscriber is in the area of a GSM PLMN mobile telephone network. The DMT terminal functions in the GSM mode. The changing of the mode of a DMT terminal can take place for instance so that the DMT terminal registers the fact that it has lost radio contact to the base station of the private telecommunication network. Alternatively, the user of a DMT terminal can choose mode by pushing a button etc. As a result of a change of mode, the subscriber becomes registered in the mobile telephone network GSM PLMN. The DMT terminal transmits a mode update to the mobile telephone network. This message can be e.g. a location update according to the normal GSM standard. The mobile switching center MSC/SSP initiates an intelligent network service request which results in the service control point SCP recording the information that the DMT subscriber is now in the GSM network.

Information about the subscriber being a so called DMT subscriber is stored in the service control point SCP of the intelligent network. This means that alternative dialling numbers, e.g. the DDI number of the PBX and the MSISDN number of the DMT subscriber, are recorded in the service control point SCP. A primary number has also been specified for the subscriber to be used in calling the subscriber. The primary number is either a number assignd especially for this service, a so called personal number, a DDI number or a MSISDN number. In calling the primary number, the routing information is received from the intelligent network. Consequently, the MSISDN number is updated as current routing information in this case.

Figure 2A:
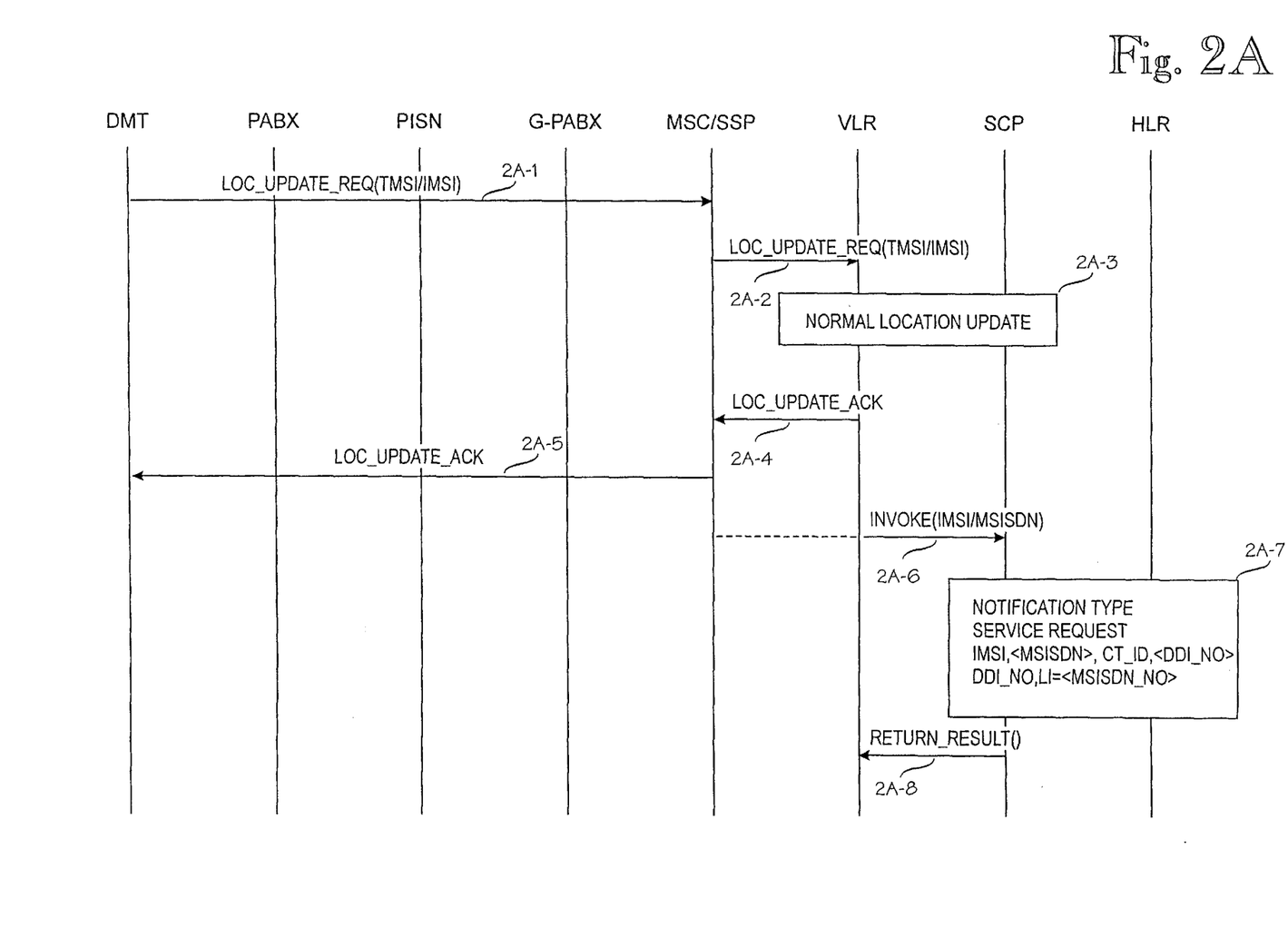
FIG. 2A shows signalling in connection with location updating when a DMT subscriber is in the area of a mobile telephone network.

FIG. 2A shows signalling in connection with location updating, when the DMT subscriber is in the area of the mobile telephone network GSM PLMN. In FIG. 2A it is assumed that a TMSI identifier or an IMSI identifier is used on the radio path to protect the identity of the subscriber, like in a normal GSM system. Location updating is initiated in the same way as in prior art location updating, e.g. in the GSM system. In step 2A-1, the dual mode terminal DMT transmits a location update request Loc_Up-date_Req. The location update request proceeds to the mobile switching center MSC. In step 2A-2, the mobile switching center MSC/SSP transmits the location update request to the Visitor Location Register VLR, which performs the location updating in step 2A-3. In step 2A-4, the visitor location register VLR transmits an acknowledgement that the location updating has been performed to the mobile switching center MSC, which transmits the acknowledgement further to the mobile terminal DMT in step 2A-5.

According to the invention, the location updating is supplemented so that in step 2A-6 the SSP which is in connection with the VLR (or the SSP in connection with the MSC) transmits a service request invocation (INVOKE) to the service control point SCP. The service request invocation comprises the following functions. In step 2A-7, the service control point SCP should check that the IMSI/MSISDN number of the mobile terminal corresponds to the primary number and store the information that the routing information corresponding to the primary number is the MSISDN number of the mobile terminal in question. (The former routing information was the address of the G-PABX +the DDI number.) In step 2A-8, the service control point SCP acknowledges that it has performed the location update.

Figure 2B:
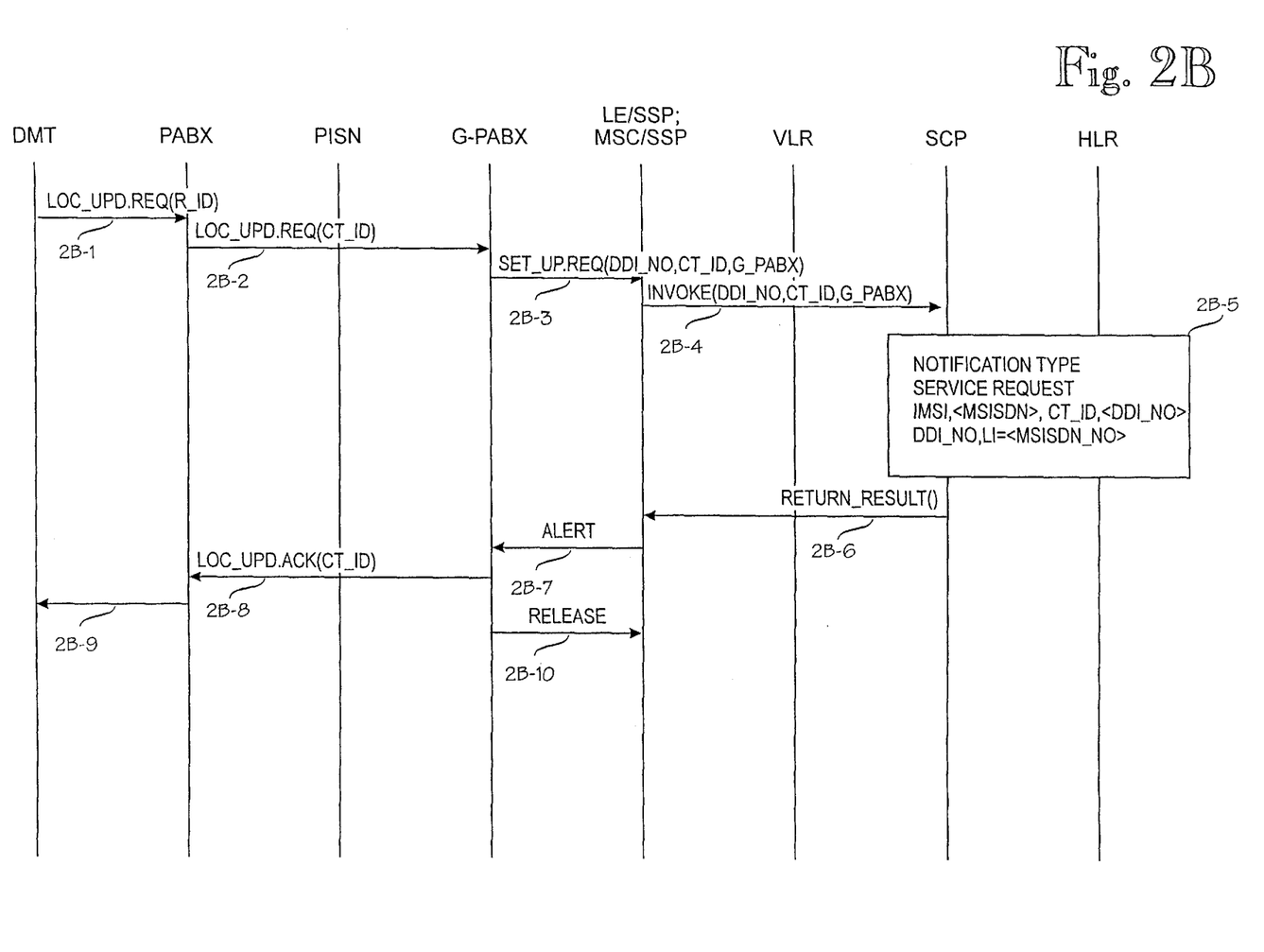
FIG. 2B shows signalling in connection with location updating when a DMT subscriber is in the area of a private network.

FIG. 2B shows signalling in location updating, when the DMT subscriber is in the area of a private network. It is assumed in FIG. 2B that different identifiers can be used in the exchange network and on the radio path. In an exchange network, the identifier of a cordless system can be referred to as CT_Id (Cordless Terminal Identity). In practice this identifier could be e.g. International Portable User Identity (IPUI), which can be constructed as an IMSI according to the ITU-T recommendation E 212. The identifier used on the radio path is referred to as R_Id (Radio Identity), which can be the same as the IPUI or be a local identifier.

In step 2B-1, the dual mode terminal transmits the location update request (e.g. a Locate Request) that comprises the identifier (e.g. R_Id) that is used on the radio path. The location update request proceeds to the service switching point SSP located in the exchange LE or MSC in steps 2B-2 . . . 2B3. There can also be a Loc_Update_Req message between the G-PABX and the mobile switching center MSC. In step 2B-4, the service switching point SSP transmits a service request to the service control point SCP. The service request comprises the following functions. In step 2B-5, the service control point SCP should check that the DDI number/CT_Id number corresponds to the primary number of the DMT terminal and store the information that the routing information corresponding to the primary number is the address and DDI number of the G-PABX exchange network. (The former routing information was the MSISDN number of the DMT terminal.) In step 2B-6, the service control point SCP acknowledges that it has performed the location updating. In steps 2B-7 . . . 2B-9, the acknowledgement proceeds to the mobile terminal DMT.

According to the invention the following information is stored in the intelligent network: the IMSI identifier and MSISDN number of the DMT terminal, the CT_Id identifier (which is preferably an IPUI) and the DDI number and the primary number in use. Furthermore, routing information RI is stored, i.e. information about to which system the area belongs whereto the location update was last performed.

Figure 2C:
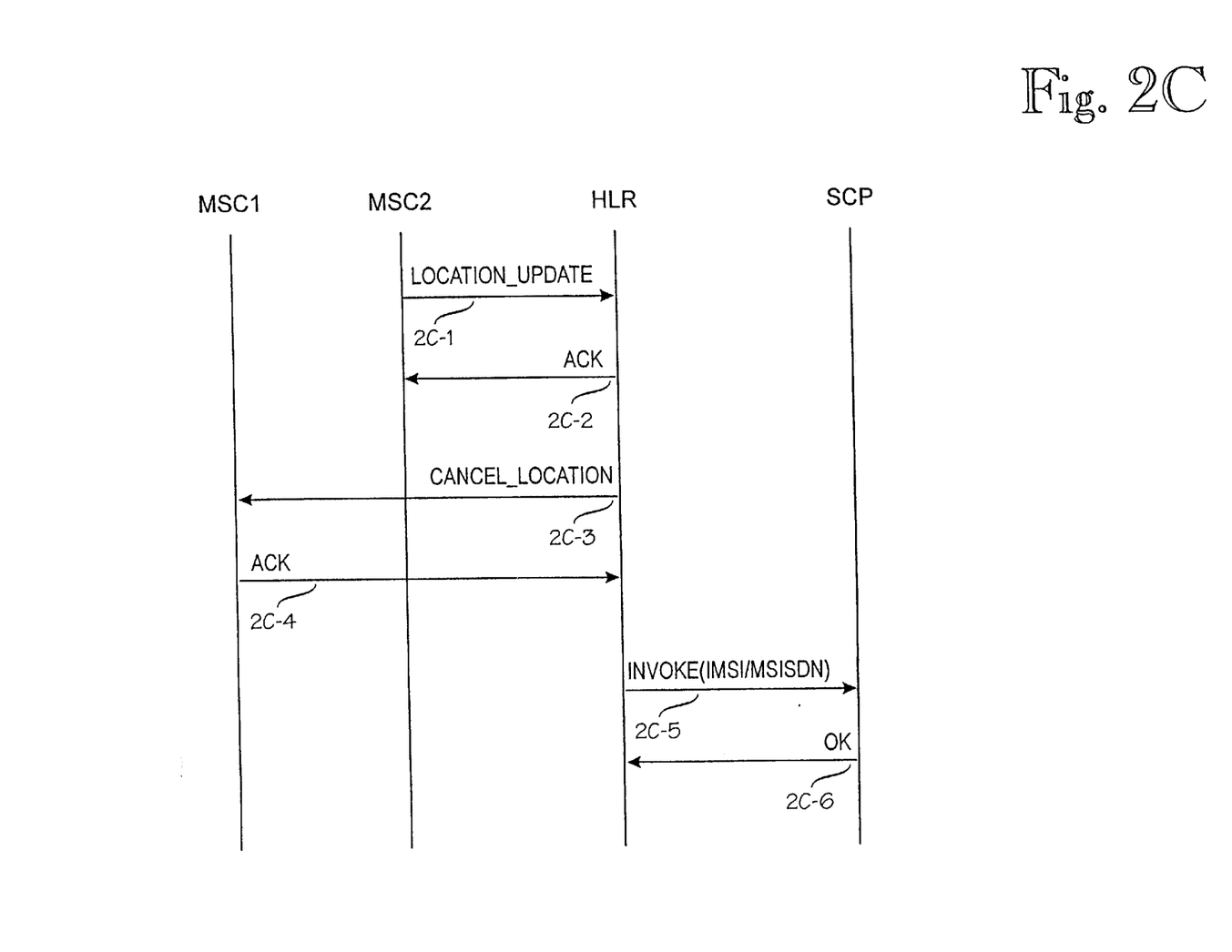
FIG. 2C is a complement to FIG. 2A in a case where (location) registration of a DMT subscriber takes place in the area of a different mobile switching center MSC in a mobile telephone network.

FIG. 2C is complementary to FIG. 2A in a case where a DMT subscriber is registered in the area of a different mobile switching center MSCn of the mobile telephone network. In step 2C-1 in FIG. 2C, the new switching center MSC2 transmits the location update to the home location register HLR that acknowledges it in step 2C-2. In step 2C-3, the home location register HLR transmits a location cancellation to the old switching center MSC1. After the acknowledgement 2C-4 in step 2C-5, the MSC1 invokes a service request to the SCP, which acknowledges it in step 2C-6.

Figure 3A:
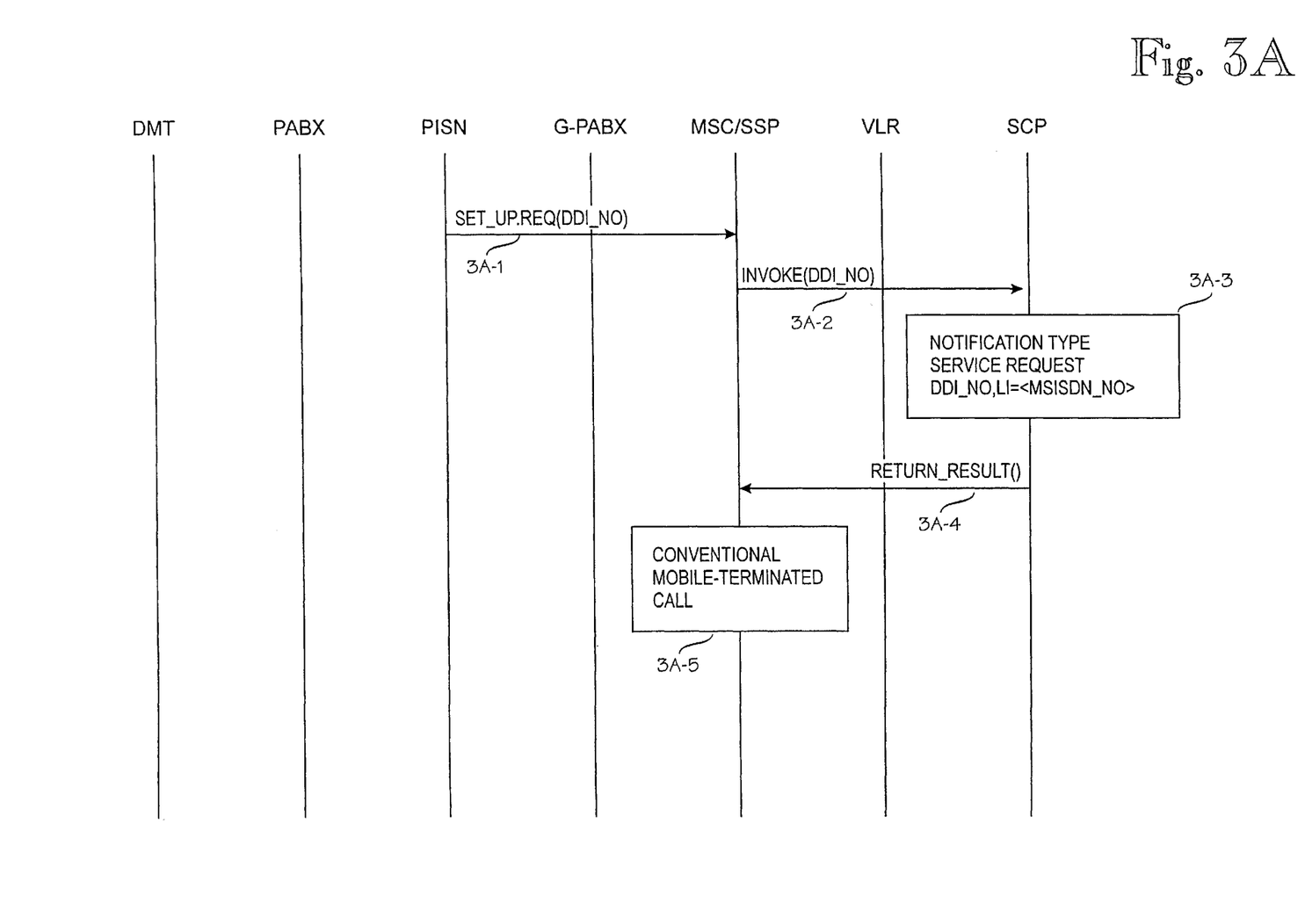
FIG. 3A shows signalling in a mobile-terminating call when a DMT subscriber is in the area of a mobile telephone network.

FIG. 3A shows signalling in a mobile-terminating call when the DMT subscriber is in the area of a GSM PLMN mobile telephone network. In step 3A-1, the mobile switching center MSC receives the mobile-terminating call. The DDI number has been used as primary number. In step 3A-2 the mobile switching center MSC/SSP transmits a service request to the service control point SCP of the intelligent network. On the basis of this service request, the service control point SCP notifies in step 3A-3 that the mobile terminal DMT to which the DDI number in question relates is located in the area of the mobile telephone network GSM PLMN. In step 3A-4, the service control point SCP transmits (returns) this information to the mobile switching center MSC. In step 3A-5, the mobile switching center MSC notifies that the service control point SCP has returned the MSISDN number of the mobile terminal DMT as its routing information. Based on this information, the mobile switching center sets up a normal mobile-terminating call.

Figure 3B:
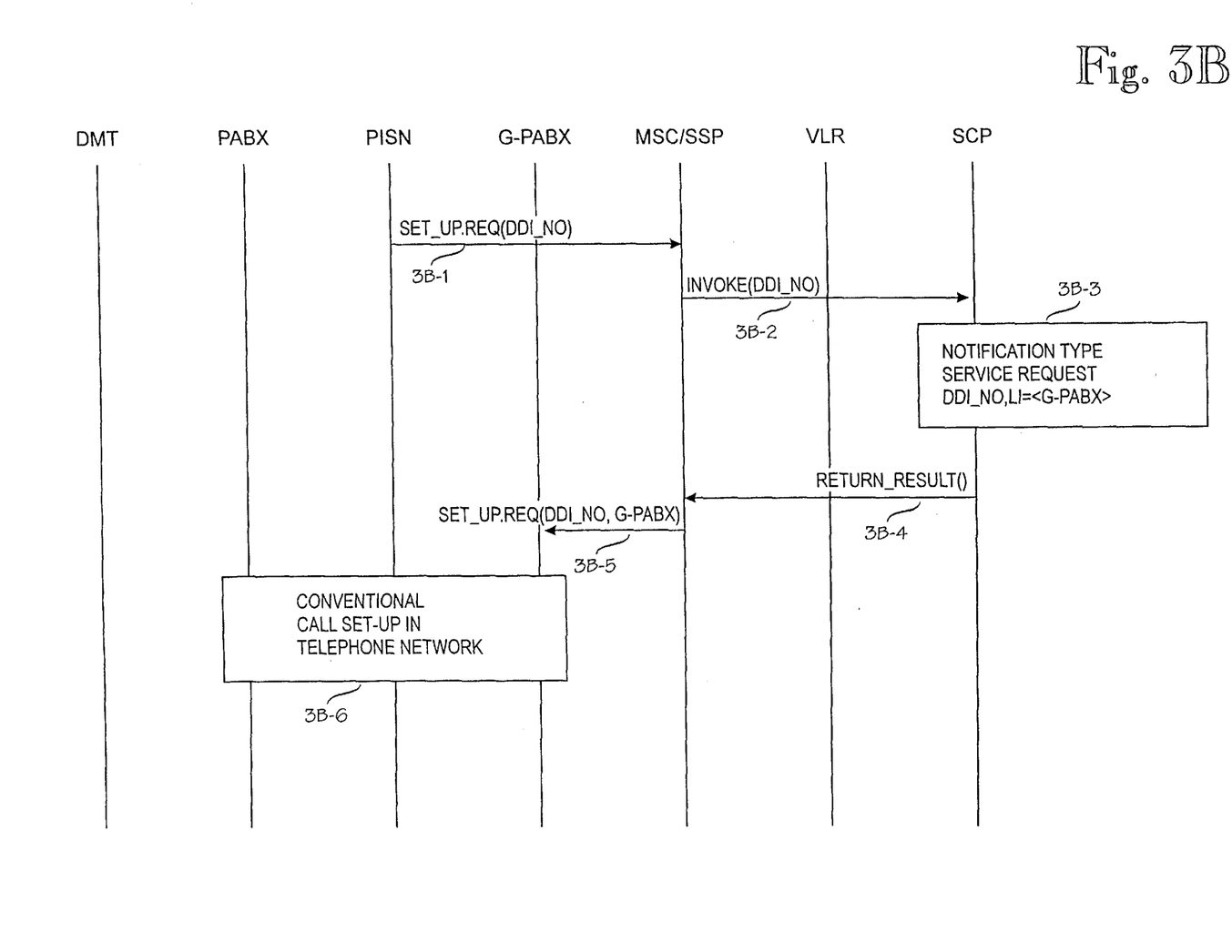
FIG. 3B shows signalling in a mobile-terminating call when a DMT subscriber is in the area of a private PISN network.

FIG. 3B shows signalling in a mobile-terminating call when the DMT subscriber is in the area of the private network PISN. It is first assumed that the DMT subscriber is in the area of a PABX network. In this case the steps 3B-1 . . . 3B-4 correspond to the steps 1–4 described in connection with FIG. 3A. In step 3B-3, the service control point SCP notifies that the mobile terminal DMT is located in the PABX network the routing address of which is G-PABX. It is assumed in the invention that the PABX network can route the call from the G-PABX to that exchange of the PABX network where the DMT terminal is located. The routing characteristics of the private network are not within the scope of the present invention. In step 3B-4 this information is transmitted (returned) to the mobile switching center MSC which in step 3B-5 transmits a call set-up request to the G-PABX. In step 3B-6, the G-PABX routes the incoming call to the mobile terminal DMT by utilizing the routing characteristics of the private network PISN.

The present invention has been described by using the GSM system as an example of the mobile network and the DECT system as an example of the private cordless network. It is obvious to those skilled in the art that the invention can be applied to other similar systems, e.g. such multifunctional systems and terminals where a satellite communication system is used instead of or in addition to a cellular mobile network. The invention and its embodiments are not to be restricted to the examples described above but can vary within the scope of the claims.

What is claimed is:

1. A method for performing location updating of a dual or multi mode terminal (DMT) in the telecommunication network, which comprises:
    a first type switched telephone network (PSTN), comprising at least one first switching system (LE);
    a second type mobile telephone network (GSM PLMN) supporting extensive subscriber mobility, comprising at least one second switching system (MSC);
    a third type telecommunication network (PISN) supporting limited subscriber mobility, comprising at least one third switching system (G-PABX); and
    in which telecommunication network a service switching point (SSP) of the intelligent network is arranged in connection with the second switching system (MSC) or the subscriber location register (VLR/HLR) connected to that or in connection with the first and second switching systems (LE, MSC), from which service switching point (SSP) a connection is arranged to the service control point (SCP) of the intelligent network;
    characterized in that the mobile terminal (DMT) in connection with location updating:
    if the second switching system (MSC) receives a location update message from the mobile terminal (DMT) the second switching system (MSC), or the subscriber location register (VLR/HLR) connected to it, transmits a service request to the service switching point (SSP) of the intelligent network, from where it is transmitted further to the service control point (SCP), said service request including an identifier and/or a number of the mobile terminal (DMT);
    if the third switching system (G-PABX) receives a location update message from the mobile terminal (DMT) it transmits the location update message to the first or second switching system (LE, MSC) which in its turn transmits a service request to the service switching point (SSP) of the intelligent network, from where it is transmitted further to the service control point (SCP), said service request including information about the location update; the identifier and/or number of the mobile terminal (DMT) and the routing address to the third switching system (G-PABX);
    in response to the service request the switching node (SCP) of the intelligent network stores the routing information concerning the location of the mobile terminal (DMT) indicated in the service request.

2. A method as claimed in claim 1, characterized in that in connection with a call terminating at a mobile terminal (DMT):
    the first or second switching system (LE, MSC), which receives a call set-up request, transmits an inquiry concerning the location of the mobile terminal (DMT) to the switching node (SCP) of the intelligent network;
    the switching node (SCP) of the intelligent network fetches from its memory the routing information corresponding to the primary number of the mobile terminal (DMT) and transmits it to the switching system (LE, MSC) that received the call set-up request,
    if the routing information indicates that the mobile terminal (DMT) is in the area of a telephone network GSM PLMN) of the second type, the call is set up like a normal mobile-terminating call; and
    if the routing information indicates that the mobile terminal (DMT) is in the area of a telecommunication network of the third type (PISN), the call is set up according to the normal protocol in a telecommunication network of the third type.

3. A method as claimed in claim 2, characterized in that a primary number has been assigned to the mobile terminal (DMT) that is valid both in the area of a telephone network of the second type (GSM PLMN) and in the area of a telecommunication network of the third type (PISN).

4. A method as claimed in claim 3, characterized in that the primary number either is a DDI number, a MSISDN number or a number especially reserved for this service, a so called personal number.

5. A method as claimed in claim 1, characterized in that the telephone network of the second type is a digital mobile telephone network like GSM/DCS.

6. A method as claimed in claim 1, characterized in that a cordless radio connection like the DECT system is used in the telecommunication network of the third type.

7. A method as claimed in claim 5 or 6, characterized in that the MSISDN number is used as routing information if the mobile terminal (DMT) is in the area of a telephone network of the second type (GSM PLMN).

8. A method as claimed in claim 5 or 6, characterized in that, while a mobile terminal (DMT) is located in the area of a telecommunication network of the third type (PISN), the routing information comprises the address of the third switching system (G-PABX), which is connected either to the first or second switching system (LE, MSC), and a DDI number which is used for locating the mobile terminal (DMT) in a telecommunication network of the third type (PISN).

9. A method as claimed in claim 5 or 6, characterized in that, while a mobile terminal (DMT) is in the area of a telecommunication network of the third type (PISN), the routing information comprises the address of the third switching system (G-PABX), which is connected either to the first or second switching system (LE, MSC), and a temporary number which is used for locating a mobile terminal (DMT) in a telecommunication network of the third type (PISN) and which number has been reserved for the mobile terminal by the telecommunication network of the third type.

10. A method as claimed in claim 5 or 6, characterized in that the ISDN number is used as routing information if the mobile terminal (DMT) is in the area of a telephone network of the first type (PSTN/ISDN).

\* \* \* \* \*

UNITED STATES PATENT AND TRADEMARK OFFICE
CERTIFICATE OF CORRECTION

PATENT NO. : 6,181,938 B1
DATED : January 30, 2001
INVENTOR(S) : Salmela et al.

It is certified that error appears in the above-identified patent and that said Letters Patent is hereby corrected as shown below:

<u>Title page,</u>
Please change "[73] Assignee: Kolster Oy AB, Espoo (FI)" to -- [73] Assignee: Nokia Telecommunications Oy, Espoo (FI) --

Signed and Sealed this

Fifteenth Day of January, 2002

Attest:

JAMES E. ROGAN
*Director of the United States Patent and Trademark Office*

*Attesting Officer*